L. F. BOYE.
BOBBIN STRIPPING MACHINE.
APPLICATION FILED OCT. 28, 1918.

1,319,202.

Patented Oct. 21, 1919.
9 SHEETS—SHEET 8.

L. F. BOYE.
BOBBIN STRIPPING MACHINE.
APPLICATION FILED OCT. 28, 1918.

1,319,202.

Patented Oct. 21, 1919.
9 SHEETS—SHEET 9.

INVENTOR
Lawrence F. Boye

WITNESSES:

by Joshua R. H. Potts
ATTORNEY ated in the drawings of the present application.

UNITED STATES PATENT OFFICE.

LAWRENCE F. BOYE, OF CHESTER, PENNSYLVANIA.

BOBBIN-STRIPPING MACHINE.

1,319,202.   Specification of Letters Patent.   Patented Oct. 21, 1919.

Application filed October 28, 1918. Serial No. 259,904.

*To all whom it may concern:*

Be it known that I, LAWRENCE F. BOYE, a citizen of the United States, residing at Chester, in the county of Delaware and State of Pennsylvania, have invented certain new and useful Improvements in Bobbin-Stripping Machines, of which the following is a specification.

It is well known in the art of weaving that bobbins after they are removed from the shuttles invariably have a certain amount of yarn thereon which has not been entirely used in the weaving operation. This waste yarn varies in amount, sometimes there being only a few wrappings or windings of yarn on the bobbin when it is discarded by the weaver and at other times, due to imperfection in the winding of the bobbin or other reasons, comparatively great amounts of yarn remain on the bobbin after it has been removed from the shuttle. Various machines have been made for the purpose of removing this waste yarn from the bobbins but up to the time of my present invention there is no machine known to the market which is capable of entirely removing the yarn from bobbins, in which the quantity of yarn varies from a comparatively few wrappings to that of dense or great bulk without injuring the bobbins.

One object of my invention is to provide a bobbin stripping machine which will entirely remove yarn from bobbins irrespective of the amount of yarn thereon and to do this without scratching, cracking or otherwise injuring or impairing the bobbins.

Another object is to so construct my improved machine that it will remove the yarn from bobbins of various lengths and diameters.

A further object is to construct my improved machine in such manner that it will have sufficient strength and apply sufficient power so as to remove the yarn from bobbins having their free ends of larger diameter than portions intermediate their ends, said bobbins being of the type usually employed in the weaving of silk and as illustrated in the drawings of the present application.

A still further object is to make my improved machine of durable and comparatively simple construction and so that it can be manipulated to quickly strip the bobbins.

These objects, and other advantageous ends which will be described hereinafter, I attain in the following manner, reference being had to the accompanying drawings in which—

Referring to the drawings, 35 represents the bed of my improved machine which is mounted on legs 36. A main power shaft 37 is rotatably mounted under the bed 35 and has thereon a pinion 38 which meshes with a gear wheel 39. This gear wheel 39 is secured to a shaft 40 mounted in a suitable bearing 41 on the top of the bed 35 and has a crank pin 42 to which is connected one end of the connecting rod 43; the other end of said rod being pivotally secured to a cam plate 44 which is slidably mounted on a guide 45 which extends longitudinally of and is mounted upon the bed 35. The cam plate 44 has a cam groove 46 which includes two parallel portions 47 which converge at their forward end as shown at 48.

Figures 20, 21:
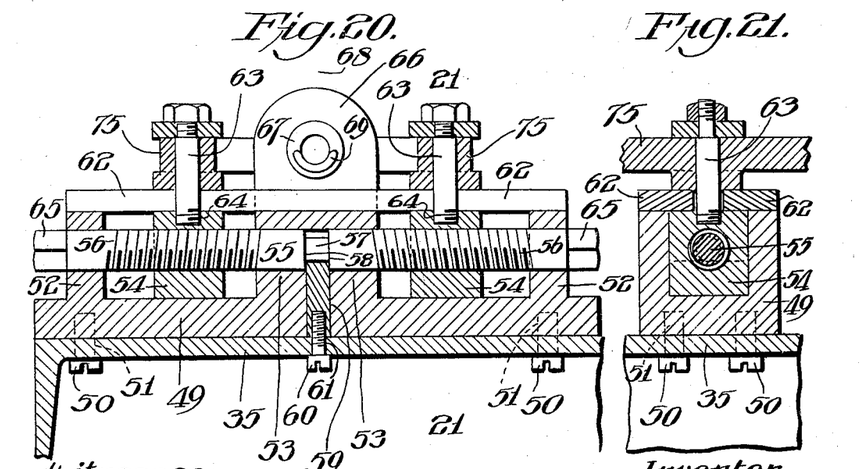
Fig. 20 is an enlarged section taken on the line 20—20 of Fig. 2.
Fig. 21 is a transverse section taken on the line 21—21 of Fig. 20.
Figure 23:
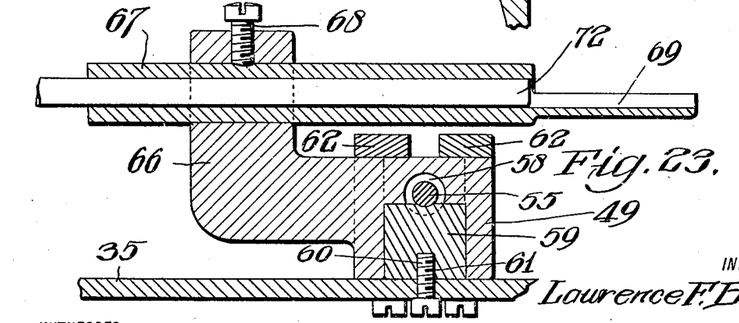
Fig. 23 is an enlarged section taken on the line 23—23 of Fig. 2.

A bearing block 49 is secured on the top of the bed 35 by screws 50 which pass through holes 51 in the bed 35. Thus the block 49 is firmly secured to the bed 35. The block 49 has lugs 52 and 53 projecting upwardly therefrom, the lug 53 being interposed between the lugs 52 as clearly shown in Fig. 20. Threaded blocks or nuts 54 are adapted to slidably fit between the respective lugs 52 and the central lug 53. An adjusting bolt 55 extends through the lugs 52 and 53 and has oppositely disposed screw threaded portions 56 which respectively engage the nuts 54. The bolt 55 at its portion within the lug 53 is reduced in diameter as shown at 57 to provide shoulders 58 between which fits a detent 59, the latter being operative to prevent longitudinal movement of the bolt 55. This detent 59 is secured to the bed 35 by means of screws 60 which pass through holes 61 in the bed 35.

Two bars 62 are mounted on the tops of the lugs 52 and are spaced apart to permit two pivot pins 63 to extend therebetween and respectively enter the nuts 54, said pivot pins being screw threaded at their lower ends and engaging tapped recesses 64 in said nuts 54.

The opposite ends of the bolt 55 have angular portions 65 which project beyond the outer surfaces of the lugs 52 so that by applying a wrench to the ends 65 the bolt 55 can be turned in opposite directions and such movement will cause the nuts 54 and pins 63 to be moved toward or from a central vertical plane; or in other words the pins 63 will be caused to move toward or from each other.

The block 49 has a forwardly projecting extension 66 which forms a bearing for a sleeve 67; this sleeve being capable of being secured in various longitudinal positions with respect to the extension 66 by means of a set screw 68 in said extension 66. The sleeve 67 has a forward projection 69 which is segmental and arcuate in cross section as clearly shown in Fig. 20 and occupies a position below the axis of the sleeve 67. This projection 69 forms a gutter or trough which provides a bearing for the free ends 70 of the bobbins 71 (see Figs. 15 and 16) as will hereinafter be more fully described.

The sleeve 67 forms a guideway for the free end portion of the plunger 72, said plunger being secured by set screws 73 in a bearing 74 on the cam plate 44.

Two cam levers 75 are pivoted between their ends on the pivot pins 63. The rear end of each of the cam levers 75 has a slot 76 extending transversely of its width as clearly shown in Figs. 18 and 19. Pins 77 have portions 78 of reduced diameter which extend through the slots 76 and nuts 79 are provided to secure the pins 77 to the cam lever 75; it being noted that the portions 80 of the pins 77 are of greater diameter than the width of the slots 76 and thereby provide shoulders which abut the lower surfaces of said cam levers 75 and securely bind the portions 78 of said pins 77 to the levers 75. It will be noted, however, that by loosening the nuts 79 the pins 77 can be moved lengthwise of the slots 76 for the purpose of adjustment now to be described.

The portions 80 of the pins 77 extend through brackets 81. These brackets have angularly extending arms 82 in which are mounted adjusting screws 83. These screws have collars 84 engaging the inner surfaces of the arms 82 so that the adjusting screws can be freely rotated but will have no longitudinal movement. These adjusting screws extend through tapped openings 85 in the cam levers 75 so that when the nuts 79 are loosened the cam levers 75 can be moved laterally to the extent of the length of the slots 76. The lower ends of the pins 77 have heads 86 and between these heads and the bottom surfaces of the brackets 81 are mounted anti-friction rollers 87. These anti-friction rollers are adapted to ride within the cam groove 46 to opposite sides of a central vertical plane passing between the parallel portions 47 of said groove as previously described.

Figure 30:
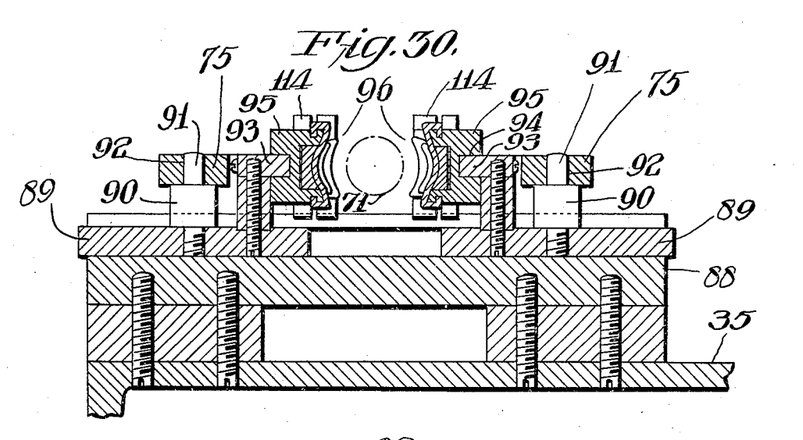
Fig. 30 is an enlarged section taken on the line 30—30 of Fig. 2.
Figure 31:
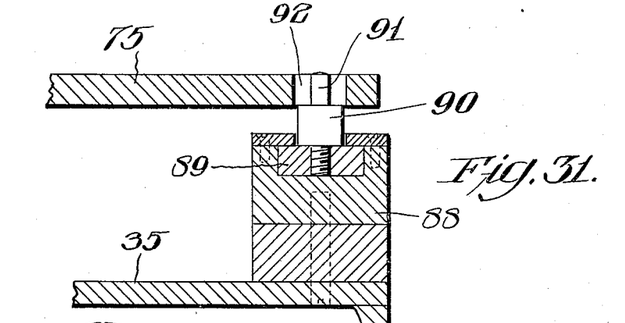
Fig. 31 is an enlarged section taken on the line 31—31 of Fig. 2.

A guide channel 88 is supported on the forward end of the bed 35 and forms a slideway for two carriages 89. These carriages have standards 90 provided with pivot pins 91 which extend through slots 92 in the forward ends of the cam levers 75, said slots extending in the direction of the length of said cam levers. The carriages 89 in turn form a support for blocks 93 which are secured within grooves 94 in shoes 95. These shoes form a part of bobbin stripping jaws 96 as clearly shown in Figs. 30 and 31. Each of the jaws 96 is similarly constructed, each shoe 95 being provided with two parallel ribs 97 thereby forming a channel 98. The outer surfaces of these ribs 97 are grooved longitudinally as illustrated at 99.

Each jaw 96 has a tongue 100 of soft yieldable material, such as rubber, which is provided with extensions 101 and 102. These extensions project in opposite directions longitudinally of and beyond the tongues 100. The tongues 100 together with the extensions 101 and 102 respectively fit within the channels 98. The inner surfaces of each tongue 100 and its extensions 101 and 102 are serrated or roughened as indicated at 103 so as to produce comparatively great friction with the inner surface of the channel 98. The extensions 101 and 102 and the inner portion of the tongue 100 are preferably made tougher and less resilient than the outer portion of the tongue 100 so as to be sufficiently strong to firmly hold the tongues 100 to the jaws in the manner now to be described.

A cover plate 104 is adapted to cover the channel 98 of each jaw and to hold the extension 101 therein. This cover plate has flanges 105 which embrace the side surfaces 106 of the shoe 95 and the extreme edge portions 107 of said flanges are bent inwardly and are adapted to slide within the grooves 94 of said shoe 95. The plate 104 has a flange 108 which is adapted to engage the end surface 109 of the tongue 100. The plate 104 also has a lug 110 which is adapted to snugly fit the channel 98 and a screw 111 within the groove 94 extends through the shoe into the lug 110 and thereby secures the plate 104 against longitudinal movement; it being noted that the edge portions 107 and flanges 105 prevent lateral movement of said plate with respect to the shoe 95. Each of the shoes 95 is grooved transversely as shown at 112, said groove extending entirely through the ribs 97 and preferably partway into the surface 113 of said shoe as clearly shown in Figs. 12 and 14.

A metallic stripper 114 is fitted within the groove 112 and has notches 115 at its opposite sides through which extensions 116 of said plate 104 are adapted to extend and thereby lock said stripper 114 to the shoe 95. The stripper 114 is recessed at 117 and the extension 102 of the tongue 100 fits within this recess 117 as clearly shown in Fig. 12. With this construction the surface 118 of the stripper 114 forms an abutment for the surface 119 which is the surface opposite the surface 109. Thus the tongue 100 is firmly housed between the flange 108 of the plate 104 and the surface 118 of the stripper 114 so that it is impossible for the tongue 100 to move longitudinally with respect to the shoe 95. It will thus be noted that the plate 104 performs three functions. In the first place it assists in preventing relative longitudinal movement of the tongue 100. Secondly it assists in preventing the tongue 100 from moving laterally. Thirdly it locks the metallic stripper 114 to the shoe 95.

Figure 9:
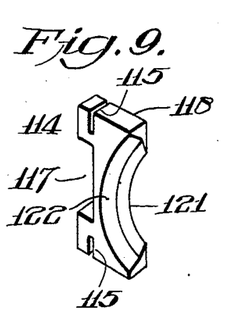
Figure 10:
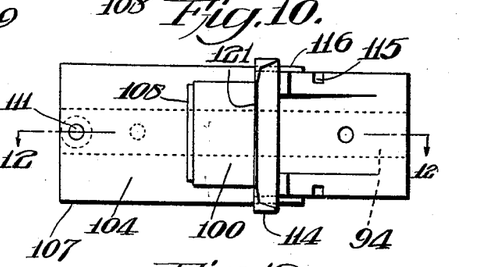
Fig. 10 is a side elevation of one of my improved bobbin stripping jaws.
Figure 11:
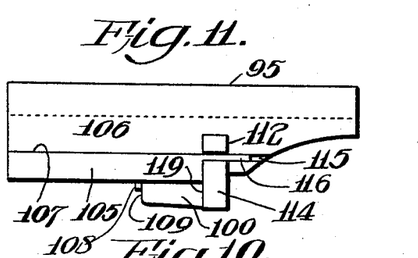
Fig. 11 is a top plan view of Fig. 10.
Figure 12:
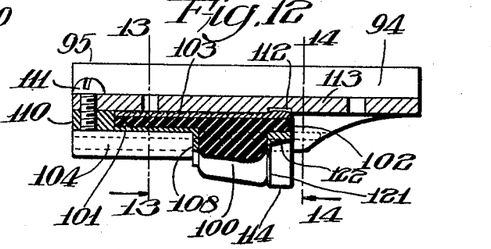
Fig. 12 is a sectional plan view taken on the line 12—12 of Fig. 10.
Figure 13:
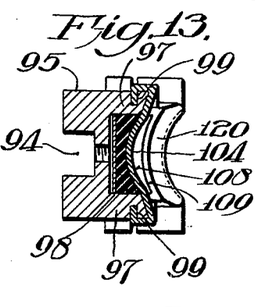
Fig. 13 is a section taken on the line 13—13 of Fig. 12.
Figure 14:
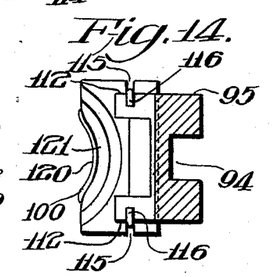
Fig. 14 is a sectional view taken on the line 14—14 of Fig. 12.

The tongue 100 has its exposed surface 120 arcuate in cross section and normally projects beyond the edge 121 of the metallic stripper 114 as clearly shown in Figs. 12, 13 and 14. This edge 121 of the metallic stripper 114 is also arcuate and comparatively thin as clearly shown in Figs. 9 and 14. The side of the stripper 114 opposite the surface 118 is beveled as shown at 122, said beveling extending up to the edge 121 and following the arc of said edge.

The shaft 37 forms a support for a pulley and clutch structure for which separate application for patent will be made and the following description thereof is given only as regards its combination with the operating parts of the machine of the present invention.

A sleeve 123 is mounted on the shaft 37 and has one end provided with an integral collar 124 which is secured to the shaft 37 by a set screw 125. The opposite end of said sleeve is externally screw threaded and fits within a tapped opening in a disk 126. This disk has ribs 127 which slide longitudinally within grooves 128 in the hub 129 of a frusto-conical clutch 130. This hub 129 is hollow and a coiled spring 131 is interposed between the disk 126 and the inner surface of said clutch. The clutch has a hole 132 through which extends the hub 133 of a pulley 134 which is freely rotatable on the sleeve 123, the oppositely disposed portion 135 of said hub 133 abutting the inner surface of the integral collar 124.

Figure 28:
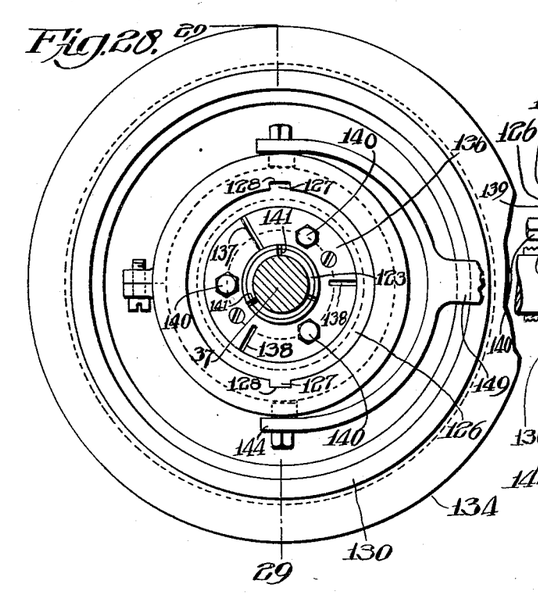
Fig. 28 is a sectional elevation taken on the line 28—28 of Fig. 24.
Figure 29:
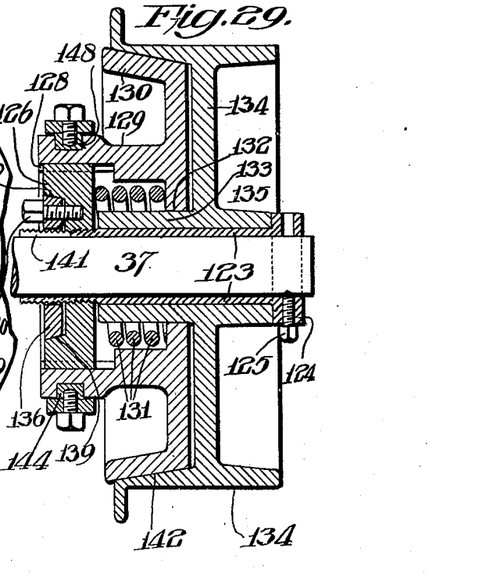
Fig. 29 is a section taken on the line 29—29 of Fig. 28.

A ring 136 is split at 137 and is also provided with notches or partial splitting 138. The peripheral edge of the ring 136 is tapered and adapted to fit a tapered opening 139 within the disk 126. The ring 136 is secured within the tapered opening 139 by means of screws 140 and by tightening on said screws the diameter of the ring 136 will be contracted so as to bind against the screw threads of the sleeve 123 and thereby assist in preventing relative movement between the sleeve 123 and the shaft 37; it being noted that the screw threaded end of the sleeve 123 is notched longitudinally as shown at 141, said notches extending inwardly as clearly shown in Figs. 28 and 29. By this construction it will be noted that the spring 131 tends to normally keep the clutch in engagement with the surface 142 of the pulley 134 so that the rotation of the pulley 134 by the driving bolt 143 will serve to rotate the shaft 37 through the medium of the clutch.

The hub 129 of the clutch has a forked arm 144 which forms the part of a lever 145 which is pivoted at 146 to a bracket 147 on the bed 35. The arm 144 engages a groove 148 in the hub 129 as clearly shown in Figs. 24 to 29 inclusive. The lever 145 extends beyond the pivot 146 and this extension 149 is adapted to engage the head of an adjusting screw 150, said adjusting screw being mounted in one end 151 of a lever 152, said lever being pivoted at 153 to said bracket 147.

It will be noted that the distance between the pivot 153 and the adjusting screw 150 is small compared to the length of the lever 152 and also is less than the distance from the pivot 146 to the contacting portion of the adjusting screw 150 with the end 149 of the lever 145. By this construction a great mechanical advantage is attained for the drive mechanism the operation of which will be described hereinafter.

The lever 152 has a collar 153 which is attached to a cylindrical casing 154 by a nut 155. This casing has a housing 156 extending at an angle thereto as clearly shown in Figs. 24 to 26 inclusive. A latch locking bolt 157 is slidably mounted within the casing 154 and has an operating rod 158 screwed therein (see Fig. 26), said rod 158 passing into the casing 154 and being slidable through a gland nut 159, said gland nut being screwed into one end of the casing 154.

A latch 160 has a stem 161 which extends at right angles to the length of the locking bolt 157, said stem having a portion 162 of reduced diameter which provides shoulders 163 and 164 between which the end 165 of the bolt 157 is adapted to slide.

A coiled spring 166 is interposed between the inner end of the gland nut 159 and the adjacent end of the latch locking bolt 157. This spring 166 normally tends to move the end 165 of the bolt 157 between the shoulders 163 and 164 of the stem 161. The housing 156 incloses the coiled spring 167 which is operative to move the stem 161 and the latch 160 outwardly. The end of the stem 161 opposite the latch 160 is provided with nuts 168 which limit the outward movement of said stem and latch by engaging the end of the housing 156 and when in this position the locking bolt 157 has its end 165 interposed between the shoulders 163 and 164 and the latch 160 cannot be moved inwardly until the rod 158 is pulled in the direction of the arrow shown in Fig. 26 to withdraw the end 165 from between the shoulders 163 and 164. This movement takes place in the operation of my machine as will hereinafter be described.

The casing 154 has two parallel ears 169 which are spaced apart and form guideways for the latch 160 to prevent the latch from rotating within the housing 156. In other words the ears 169 permit the latch to move inwardly and outwardly with respect to the casing 154 but prevent any rocking or rotatable movement relative to said housing. The casing 154 and latch 160 actually form a part of the lever 152. For example if the latch 160 is locked by the end 165 of the locking bolt 157 any lateral pressure applied to the latch 160 will rock the lever 152 on the pivot 153. On the contrary if the rod 158 is pulled to withdraw the end 165 of the bolt 157 from between the shoulders 163 and 164 a lateral pressure upon the latch 160 will move the stem 161 inwardly against the action of the spring 167 and the lever 152 will not be moved.

Figure 6:
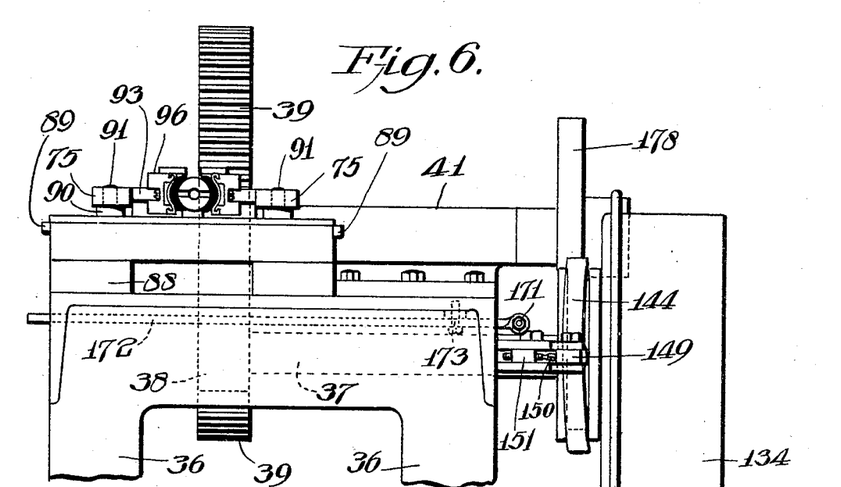
Fig. 6 is a view of similar nature to Fig. 5 showing said bobbin stripping jaws in engagement with a bobbin.
Figure 7:
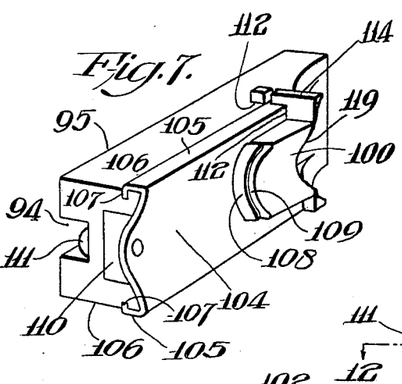
Fig. 7 is a perspective view of one of my bobbin stripping jaws.
Figure 8:
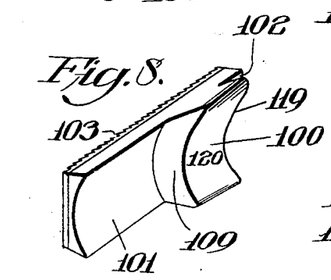
Figs. 8 and 9 are perspective views of certain of the elements forming a part of the bobbin stripping jaw shown in Fig. 7.

The rod 158 has a pivot or knuckle joint 170 within its length and is connected by a screw thread connection 171 to one end of a lever 172, said lever being pivotally connected to the bed 35 as shown at 173 (see Fig. 6). The lever 172 extends beyond the side of the bed 35 and can be operated by hand if desired. Or, it can be operated by a treadle 174 which is connected by a cable 175 to one arm of a bell-crank-lever 176, the other end of said bell-crank-lever being connected by a cable 177 to said lever 172.

The shaft 40 has a flanged wheel 178 secured thereon, said wheel carrying a latch-engaging pin 179. The latch 160 projects into the path of movement of said pin 179 during the rotation of the shaft 140, said latch having a beveled surface 180 against which the pin 179 is adapted to engage.

Figure 25:
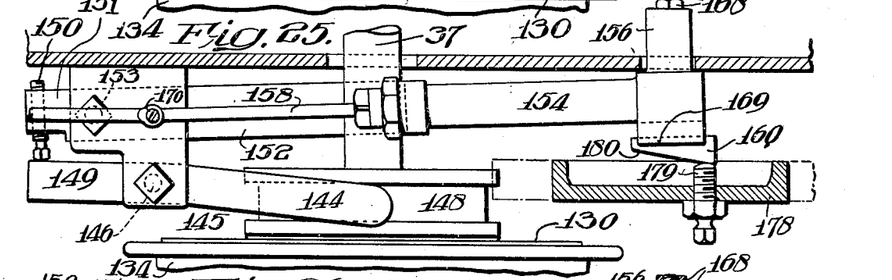
Fig. 25 is a view of the same general character as Fig. 24 showing said elements in the position they occupy when the machine has automatically stopped.
Figure 26:
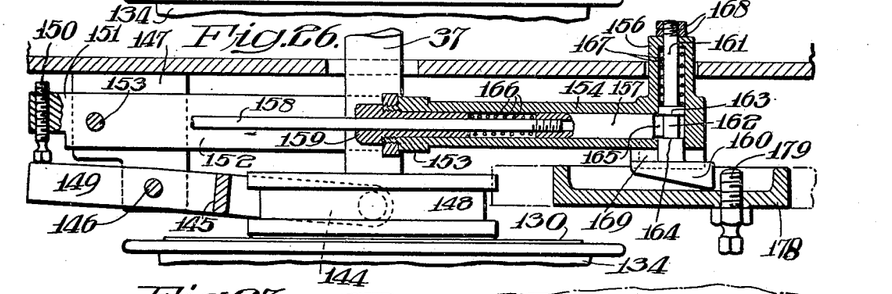
Fig. 26 is a view of similar character to Figs. 24 and 25 showing said latter parts in the position which they occupy when the machine is starting from the stopped position shown in Fig. 25.
Figure 27:
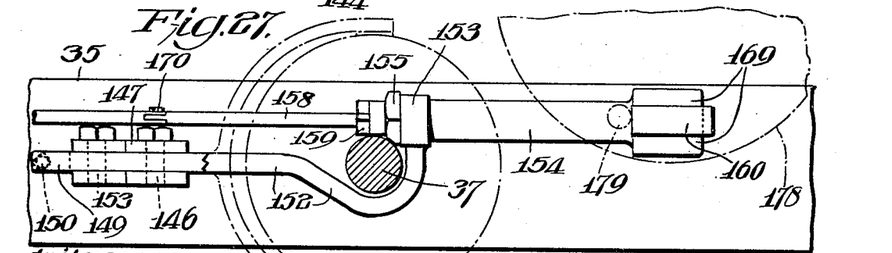
Fig. 27 is a side elevation of Fig. 24.

The spring 135 in the clutch 130 normally tends to move said clutch into frictional engagement with the pulley 134 and when the clutch and pulley are thus in engagement the shaft 37 will be rotated and in turn will rotate the shaft 40 through the medium of the pinion 38 and gear wheel 39. This motion, however, continues for only one rotation of the shaft 40 in view of the fact that the latch 160 is locked to the casing 154 and is also in the path of movement of the pin 179. During this rotation of the shaft 40 the pin 179 engages the surface 180 and since said surface is beveled the action of the pin will push the latch out of its path or partway out of its path and in so doing will rock the lever 152 on its pivot 153. This action causes the screw 150 to rock the lever 145 on the pivot 146 to cause said lever to move the clutch 130, against the action of the spring 135, out of frictional contact with the pulley 134 and thereby stop the rotation of the shaft 37 and connected parts. The latch 160 is of such width that when the clutch 130 is disengaged and the machine is stopped said latch will be in contact with the pin 179 as shown in Fig. 25.

Figure 24:
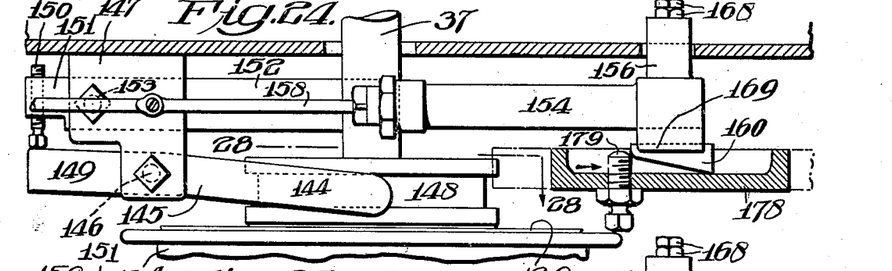
Fig. 24 is an enlarged fragmentary plan view, showing certain of the elements in section, of a portion of the operating elements showing the same in position while the machine is running.

Fig. 24 shows the parts in their position while the machine is running, the pin 179 being shown in a position approaching the latch 160. To again start the rotation of the shaft 37 it is necessary to withdraw the end 165 of the locking bolt 157 from between the shoulders 163 and 164. This can be done, as above described, either by operating the treadle 174 or by manually moving the lever 172.

Since as previously stated the tension of the spring 135 normally tends to move the clutch into frictional engagement with the pulley 134 it will be noted that this action of the spring through the connecting parts causes the latch 160 to press against the pin 179. Therefore when the bolt 157 is moved to free the stem 161 the action of the spring 135 of the clutch will move the clutch into engagement with the pulley and will also correspondingly move the levers 145 and 152. The stem 161 thus being freed the movement of the wheel 178 will push the latch 160 relatively to the casing 154 and the wheel 178 will rotate for a single revolution; it being noted that during the course of this latter mentioned movement of the wheel 178 that the rod 158 has been released and the spring 166 acted to again move the end 165 of the bolt 157 between the shoulders 163 and 164. When the pin 179 again approaches the latch 160 as shown in Fig. 24 the action of withdrawing the clutch and stopping the rotation of the shaft 37 will be repeated.

Figures 1, 22:
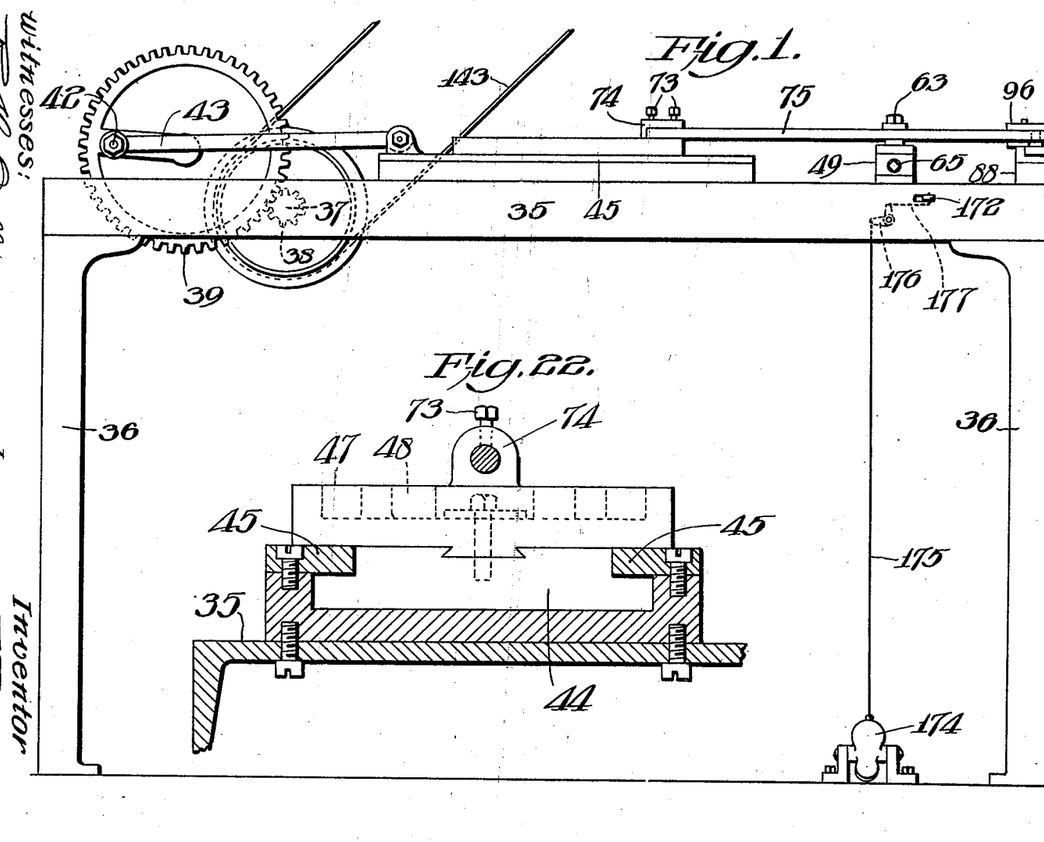
Figure 1 is a side elevation of my improved machine.
Fig. 22 is an enlarged section taken on the line 22—22 of Fig. 2.
Figure 2:
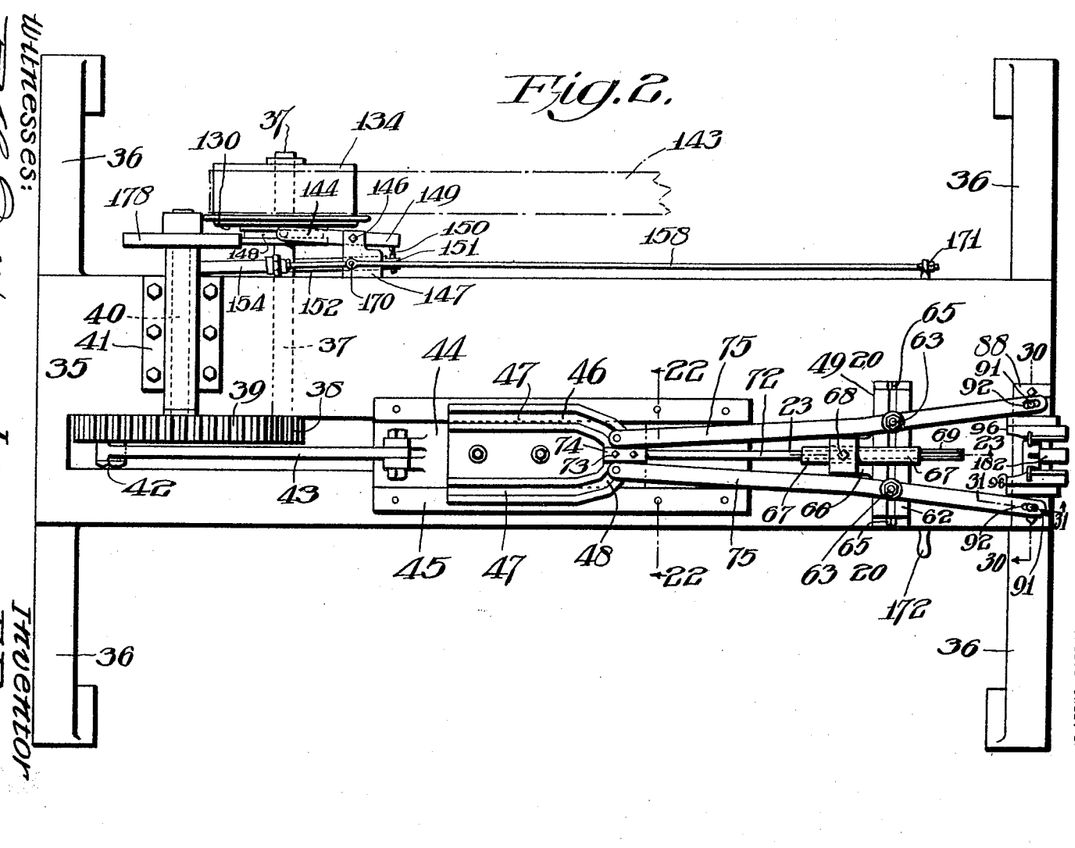
Fig. 2 is a top plan view of Fig. 1.
Figure 3:
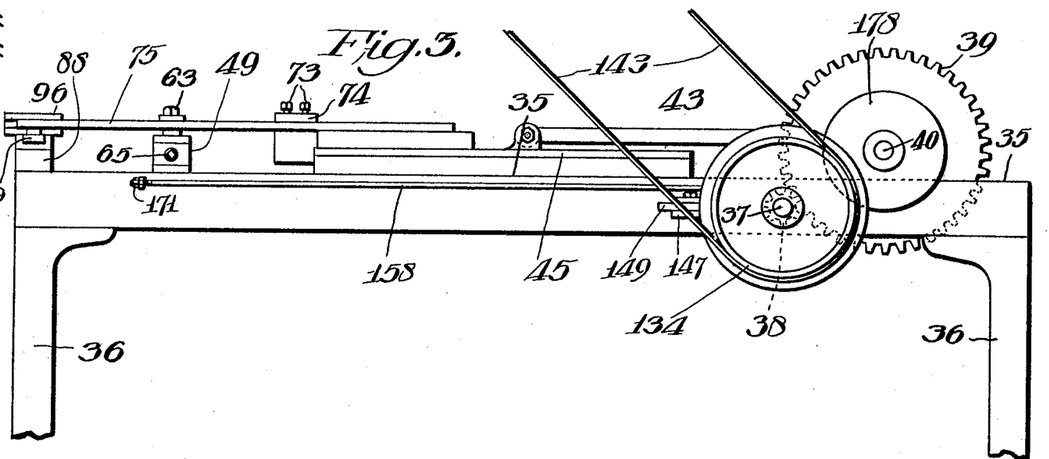
Fig. 3 is an elevation of the opposite side of my improved machine.
Figure 4:
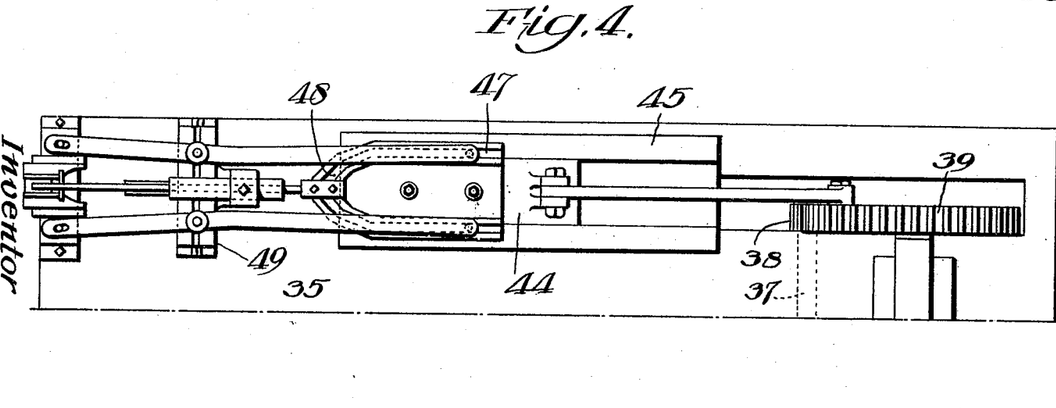
Fig. 4 is a fragmentary plan view of Fig. 3.
Figure 5:
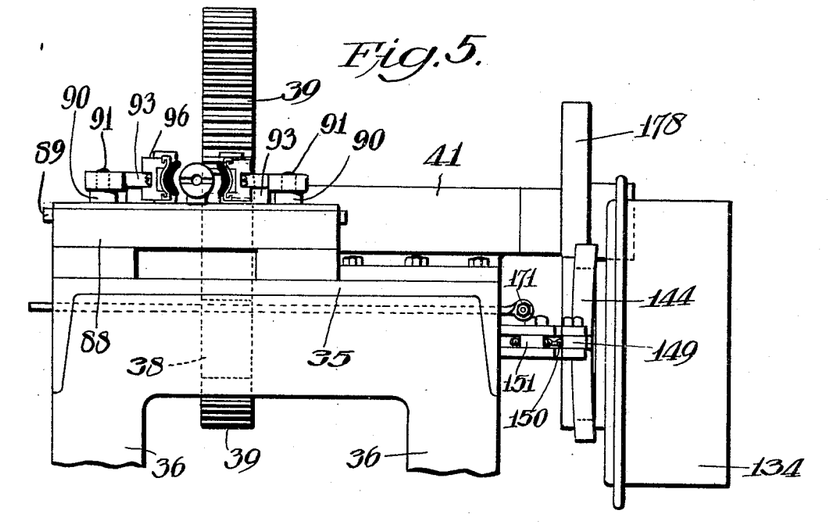
Fig. 5 is an end elevation showing my improved bobbin stripping jaws separated.

This operating action permits the positioning of the bobbins and the removal from the machine of the stripped yarn and at the same time the parts operate to exert great power for the stripping action. The bobbins are stripped of their yarn in the following manner:

The free end 70 of the bobbin is placed within the gutter provided by the projection 69 and the head 181 is placed upon a rest 182 which is mounted between the jaws 96 when the same are in their separated position as shown in Fig. 2. The rod 158 is then actuated either manually by the operation of the lever 172 or by foot power by the operation of the treadle 174. This effects the rotation of the shaft 40 in the manner above described and the connecting rod 43 is operated to slide the cam plate 44 forwardly and rearwardly.

Figures 15, 16, 17, 18, 19:
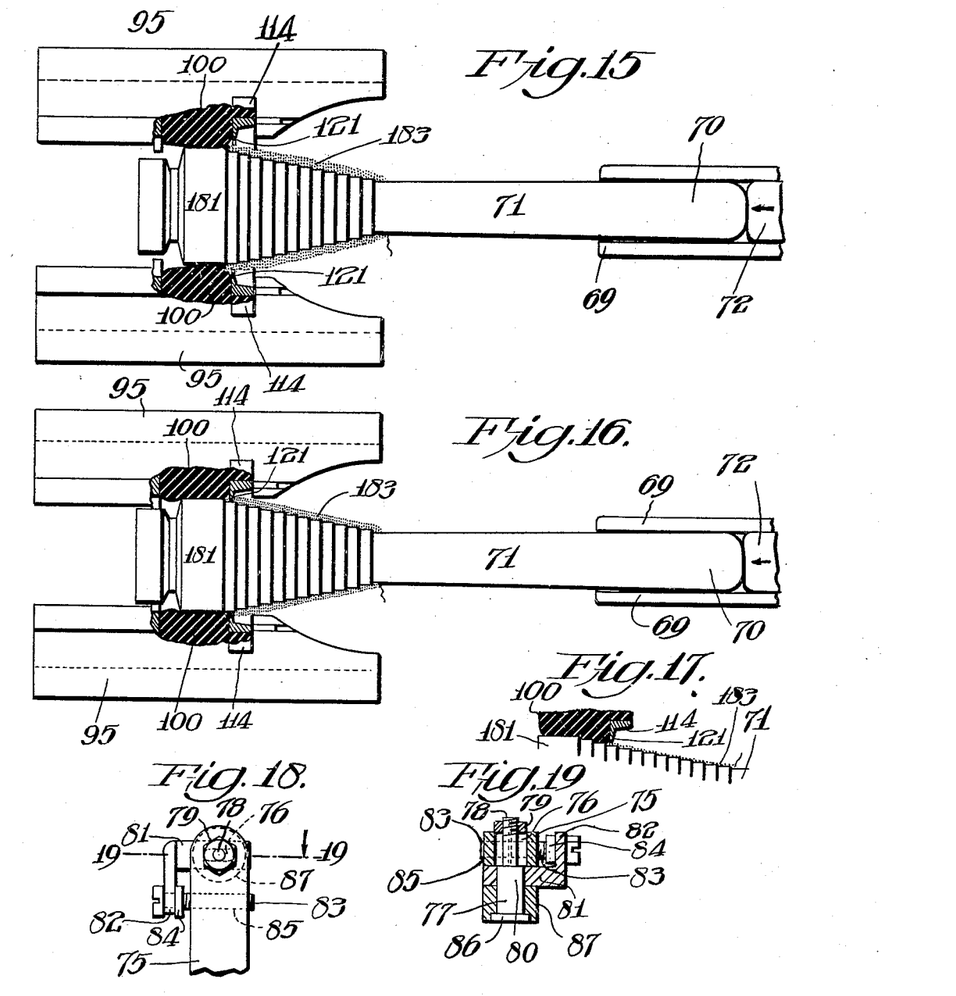
Fig. 15 is a top plan view showing the relative positions of the jaws as they move into contact with a bobbin to strip the yarn therefrom.
Fig. 16 is a view of similar nature to Fig. 15 showing said jaws moved closer together and showing the relative positions of certain of the parts of said jaws ready to strip said yarn from the bobbin.
Fig. 17 is a fragmentary plan view, partly in section, showing how my improved jaws operate to strip yarn from the bobbin when there are comparatively few windings of yarn thereon, certain of the stripping elements not coming into action but permitting the yarn to be removed entirely by soft resilient means which forms a part of my invention.
Fig. 18 is a fragmentary top plan view of a cam operated arm which forms a part of my invention and illustrative of certain adjustable features thereof.
Fig. 19 is a section taken on the line 19—19 of Fig. 18.

During this operation the anti-friction rollers 87 ride within the cam groove 46 in opposite directions into the parallel portions 47 of said groove. This causes the same lever 75 to swing on the pivot pins 63 to move the jaws 96 toward the bobbin. The soft rubber tongues 100 initially engage the head 181 of the bobbin and during a continued movement of said jaws together said tongues 100 are slightly compressed against said head 181. During this compressing movement the jaws 121 of the metallic strippers 114 embed themselves in the yarn which is indicated at 183. Fig. 15 shows the tongues 100 initially engaging the head 181 prior to the engagement of said edges 121 of the metallic strippers 114. Fig. 16 shows the tongues 100 compressed and the edges 121 of the metallic strippers 114 embedded within the yarn 183. However, it will be noted that in this innermost position of the strippers 114 that they do not contact or engage the bobbin proper.

During the forward movement of the cam plate 44 as just described, the plunger 72 moves through the sleeve 67 and engages the free end 70 of the bobbin and pushes the bobbin forwardly. The tongues 100 and the metallic strippers 114 jointly serve to prevent the yarn 183 taking the movement of the bobbin. The strippers 114 being made of metal are sufficiently strong to take the thrust of the major portion or body of the yarn 183. The tongues 100 being resilient and in direct contact with the bobbin 71 retain and cause to be stripped any portion of the yarn which is not removed by the engagement of the yarn with the strippers 114. This co-action of the tongues 100 and the strippers 114 provide a practically perfect stripping means and at the same time there are no harsh or metallic portions which engage the bobbin proper so that during the stripping action the bobbin is not injured or its value impaired.

The construction of the jaws as above specifically described prevents the tongues from being readily fractured or broken since they are so snugly housed and protected to prevent sheering action due to the relative movement of the bobbins. After the bobbins have been pushed by the plunger 72 they will drop from the rest 182 and as the wheel 39 continues its rotation the connection rod 43 will move the cam plate rearwardly and the shaft 37 will be stopped by the mechanism above described.

As previously stated bobbins of various diameters can be stripped and when it is desired to change the parts to suit bobbins of different diameters the large or great adjustment can be attained by turning the bolt 55 in order to separate or move together, as the occasion may require, the pivot pins 63. Smaller adjustments as to the travel of the jaws 76 can be made by the means shown in Figs. 18 and 19 by loosening the nuts 79 and turning the adjusting screws 83. If it is desired to adjust the machine to accommodate bobbins of various lengths the same can be done by loosening the set screw 68 and moving the sleeve 67 longitudinally after which the set screw 68 can be again tightened.

My improved machine is capable of removing comparatively great amounts of yarn from bobbins or even a comparatively few windings of yarn. Fig. 17 is illustrative of the action of the tongues 100 when there are comparatively few windings of yarn thereon. In this instance it will be noted that the metallic strippers 114 do not engage the yarn but merely serve as abutting and protective members for the sides of the tongues 100 while said tongues are removing said yarn. It is therefore unnecessary to change or adjust the parts when yarn of different density is encountered on the bobbins as they are successively placed in the machine.

The parts of my invention are capable of removing yarn from bobbins in which the free end 70 is of greater diameter than a portion of the bobbin within its length. Figs. 15 and 16 illustrate a bobbin of such type which is usually employed for the weaving of silk and the machine is capable of exerting sufficient power to force the bobbin through the yarn and over said end portion 70. The friction of the jaws 96 is such that this action will not injure the parts which cause the stripping.

When it is desired to remove the tongues 100 and the strippers 114 it is merely necessary to remove the screws 111 and to slide the covers 104 until the extensions 101 are exposed and the extensions 116 are retracted from the notches 115 of the strippers 114. The strippers can then be removed bodily to free the extensions 102 of the tongues 100 and the entire tongues can be removed.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A bobbin stripping machine having two stripping jaws relatively movable toward and from each other, each of said jaws including a tongue made of resilient non-metallic material for direct engagement with the bobbins; and means for effecting relative movement between the bobbins and jaws in a direction transversely to the direction of movement of the jaws toward each other; substantially as described.

2. A bobbin stripping machine having two stripping jaws relatively movable toward and from each other, each of said jaws including a tongue made of resilient non-metallic material for direct engagement with the bobbins; and means for effecting relative movement between the bobbins and jaws in a direction transversely to the direction of movement of the jaws toward each other; said jaws including abutting means for said tongues for limiting the yielding of said tongues in the direction of said relative transverse movement, substantially as described.

3. A bobbin stripping machine having two stripping jaws relatively movable toward and from each other, each of said jaws including a resilient tongue for engagement with the bobbins and non-resilient strippers located respectively adjacent to said tongues; and means for effecting relative movement between the bobbins and jaws in a direction transversely to the direction of movement of the jaws toward each other, substantially as described.

4. A bobbin stripping machine having two stripping jaws relatively movable toward and from each other, each of said jaws including a resilient tongue for engagement with the bobbins and non-resilient strippers located respectively adjacent to said tongues; and means for effecting relative movement between the bobbins and jaws in a direction transversely to the direction of movement of the jaws toward each other; said non-resilient strippers serving as abutting means for said resilient tongues for limiting the yielding of said tongues in the direction of said relative transverse movement; substantially as described.

5. A bobbin stripping machine having two stripping jaws relatively movable toward and from each other, each of said jaws including a resilient tongue for engagement with the bobbins and non-resilient strippers located respectively adjacent to said tongues; and means for effecting relative movement between the bobbins and jaws in a direction transversely to the direction of movement of the jaws toward each other; said resilient tongues normally projecting beyond said non-resilient strippers; substantially as described.

6. A bobbin stripping machine having two stripping jaws relatively movable toward and from each other, each of said jaws including a resilient tongue for engagement with the bobbins and non-resilient strippers located respectively adjacent to said tongues; and means for effecting relative movement between the bobbins and jaws in a direction transversely to the direction of movement of the jaws toward each other; said resilient tongues normally projecting beyond said non-resilient strippers; and means for producing said movement of the jaws toward and from each other; said means being operative to move the jaws until said tongues engage the bobbins but to prevent said strippers from engaging said bobbins proper; substantially as described.

7. A bobbin stripping machine having two stripping jaws relatively movable toward and from each other, each of said jaws including a resilient tongue for engagement with the bobbins; means for effecting relative movement between the bobbins and jaws in a direction transversely to the direction of movement of the jaws toward each other; said jaws including abutting means for said tongues for limiting the yielding of said tongues in the direction of said relative transverse movement; said abutting means having portions disposed adjacent opposite portions of said tongues whereby said tongues are embraced by said portions; substantially as described.

8. A bobbin stripping machine having two stripping jaws relatively movable toward and from each other, each of said jaws including a resilient tongue for engagement with the bobbins; means for effecting relative movement between the bobbins and jaws in a direction transversely to the direction of movement of the jaws toward each other; said jaws including abutting means for said tongues for limiting the yielding of said tongues in the direction of said relative transverse movement; said abutting means having portions disposed adjacent opposite portions of said tongues whereby said tongues are embraced by said portions; said portions being made of non-resilient material; one of said portions of each jaw serving as stripping means together with its adjacent tongue; substantially as described.

9. A bobbin stripping machine having stripping jaws, each of said jaws including a shoe having a channel therein; a resilient tongue having a portion extending within said channel and means for locking said portion within said channel; substantially as described.

10. A bobbin stripping machine having stripping jaws, each of said jaws including a shoe having a channel therein; a resilient tongue having a portion extending within said channel and means for locking said portion within said channel; and a non-resilient stripper operative in conjunction with said tongue; substantially as described.

11. A bobbin stripping machine having stripping jaws, each of said jaws including a shoe having a channel therein; a resilient tongue having a portion extending within said channel and means for locking said portion within said channel; and a metallic stripper operative in conjunction with said tongue and locked to said jaw by said locking means; substantially as described.

12. A bobbin stripping machine having stripping jaws, each of said jaws including a shoe having a channel therein; a resilient tongue having an extension fitting within said channel; and a member adapted to cover the extension of said tongue within the channel; substantially as described.

13. A bobbin stripping machine having stripping jaws, each of said jaws including a shoe having a channel therein; a resilient tongue having an extension fitting within said channel; said shoe having grooves therein; a plate adapted to cover said channel and having portions slidable within said grooves; and means for securing the plate to the shoe; substantially as described.

14. A bobbin stripping machine having stripping jaws, each of said jaws including a shoe having a channel therein; a resilient tongue having an extension fitting within said channel; and a member adapted to cover the extension of said tongue within the channel; said member having a portion adapted to abut one end of said shoe; substantially as described.

15. A bobbin stripping machine having stripping jaws, each of said jaws including a shoe having a channel therein; a resilient tongue having an extension fitting within said channel; a member adapted to cover the extension of said tongue within the channel; and a non-resilient stripper; said member having a portion adapted to lock said stripper to the shoe; substantially as described.

16. A bobbin stripping machine having stripping jaws, each of said jaws including a shoe having a channel therein; a resilient tongue having an extension fitting within said channel; a member adapted to cover the extension of said tongue within the channel; said tongue having a second extension; and a non-resilient stripper adapted to be secured to said shoe and to secure said second extension within said channel; substantially as described.

17. A bobbin stripping machine having stripping jaws, each of said jaws including a shoe having a channel therein; a resilient tongue having an extension fitting within said channel; said shoe having grooves therein; a plate adapted to cover said channel and having portions slidable within said grooves; means for securing the plate to the shoe; said tongue having a second extension oppositely disposed to said first extension; and a non-resilient stripper having a portion extending over said second extension of the tongue; said plate having a portion adapted to lock said non-resilient stripper to the jaw; substantially as described.

18. A bobbin stripping machine having stripping jaws, each of said jaws including a shoe having a channel therein; a resilient tongue having an extension fitting within said channel; said shoe having grooves therein; a plate adapted to cover said channel and having portions slidable within said grooves; means for securing the plate to the shoe; said tongue having a second extension oppositely disposed to said first extension; and a non-resilient stripper having a portion extending over said second extension of the tongue; said jaw having notches therein; said plate having portions adapted to slide within said notches and thereby lock said stripper to the jaw; substantially as described.

19. A bobbin stripping machine having stripping jaws, each of said jaws including a shoe having a channel therein; a resilient tongue having an extension fitting within said channel; said shoe having grooves therein; a plate adapted to cover said channel and having portions slidable within said grooves; means for securing the plate to the shoe; said tongue having a second extension oppositely disposed to said first extension; and a non-resilient stripper having a portion extending over said second extension of the tongue; said plate having a portion adapted to lock said non-resilient stripper to the jaw; said jaw having grooves in which said non-resilient stripper fits to prevent relative movement between the jaw and said stripper; substantially as described.

20. A bobbin stripping machine including two pivoted levers; an actuating cam having grooves; means for engagement with said grooves; slots in said levers; means for adjustably securing portions of said means in said slots; adjusting means operative to move said portions relatively to said levers within said slots, whereby the levers are adjusted relatively to the cam grooves; and stripping jaws carried by said levers; substantially as described.

21. A bobbin stripping machine including two pivot members; two levers respectively pivoted on said members; bobbin stripping jaws carried by said levers; means for moving said levers on their pivots whereby the jaws are moved toward and from each other; screw threaded supports for said members; a supporting structure; and a bolt mounted on the supporting structure and having oppositely pitched threaded portions respectively engaging the threaded supports for said pivots whereby when said bolt is rotated in opposite directions, said pivot members will be moved toward and from each other; substantially as described.

22. A bobbin stripping machine including stripping jaws movable toward and from each other; a support for one end of the bobbins between said jaws; a second support for said bobbins; and means for adjustably securing said second support at various distances from said first support; substantially as described.

23. A bobbin stripping machine including stripping jaws movable toward and from each other; a support for one end of the bobbins between said jaws; a supporting structure; a sleeve adjustably mounted in said supporting structure so as to be movable toward and from said support; an extension on said sleeve and having an upper surface in line with the bottom of the opening in said sleeve, said sleeve forming a support for the front ends of the bobbins; and a plunger movable through said sleeve to engage the portions of the bobbins on said second support for moving the bobbins between said jaws; substantially as described.

24. A bobbin stripping machine including a cam plate having a cam groove thereon; stripping jaws; levers adapted to move said jaws; slots in said levers; pins extending through said slots and secured to said levers; and means on said pins for engagement with the groove of said cam plate; said pins being adjustable in the direction of the length of said slots; substantially as described.

25. A bobbin stripping machine including a cam plate having a cam groove thereon; stripping jaws; levers adapted to move said jaws; slots in said levers; pins extending through said slots and secured to said levers; and means on said pins for engagement with the groove of said cam plate; said pins being adjustable in the direction of the length of said slots; means mounted on said pins providing bearings; and adjusting screws in said bearings adapted to engage threaded openings in said levers; substantially as described.

26. A bobbin stripping machine including stripping jaws; means for moving said jaws toward and from each other and including a reciprocating member; a rotatable shaft; means connecting said reciprocating member with said shaft; main driving means; a clutch normally operative to engage said main driving means; means rotatable by said shaft; and lever mechanism adapted to be actuated by said latter means during each rotation of said shaft to move said clutch out of engagement with said main driving means whereby said shaft will be stopped after each revolution; substantially as described.

27. A bobbin stripping machine including stripping jaws; means for moving said jaws toward and from each other and including a reciprocating member; a rotatable shaft; means connecting said reciprocating member with said shaft; main driving means; a clutch normally operative to engage said main driving means; means rotatable by said shaft; lever mechanism adapted to be actuated by said latter means during each rotation of said shaft to turn said clutch out of engagement with said main driving means whereby said shaft will be stopped after each revolution; a latch carried by said lever mechanism; means for automatically moving said latch into the path of said latter actuating means; means for locking said latch in said latter position; and means for releasing said locking means; substantially as described.

28. A bobbin stripping machine including stripping jaws; means for moving said jaws toward and from each other and including a reciprocating member; a rotatable shaft; means connecting said reciprocating member with said shaft; main driving means; a clutch normally operative to engage said main driving means; means rotatable by said shaft; lever mechanism adapted to be actuated by said latter means during each rotation of said shaft to move said clutch out of engagement with said main driving means whereby said shaft will be stopped after each revolution; a latch carried by said lever mechanism; means for automatically moving said latch into the path of said latter actuating means; means for automatically locking said latch in said latter position; and means for releasing said locking means; substantially as described.

29. A bobbin stripping machine including stripping jaws; means for moving said jaws toward and from each other and including a reciprocating member; a rotatable shaft; means connecting said reciprocating member with said shaft; main driving means; a clutch normally operative to engage said main driving means; a pin rotatable in conjunction with said shaft; lever mechanism; a latch carried by said lever mechanism; means for automatically moving said latch into the path of said pin; means for locking said latch in said latter position whereby said pin will move said lever mechanism through the medium of engagement with said latch to effect the disengagement of said clutch from the main driving means to stop the rotation of said shaft; and means for releasing said locking means to free said latch and thereby permit the clutch to engage said main driving means; substantially as described.

30. A bobbin stripping machine including stripping jaws; means for moving said jaws toward and from each other and including a reciprocating member; a rotatable shaft; means connecting said reciprocating member with said shaft; main driving means; a clutch normally operative to engage said main driving means; means rotatable by said shaft; lever mechanism adapted to be actuated by said latter means during each rotation of said shaft to turn said clutch out of engagement with said main driving means whereby said shaft will be stopped after each revolution; a latch carried by said lever mechanism; means for automatically moving said latch into the path of said latter actuating means; means for locking said latch in said latter position; and means for releasing said locking means; said lever mechanism including two independently pivoted levers, one of which carries said latch, the other being connected to said clutch; said levers having contacting portions; substantially as described.

31. A bobbin stripping machine including stripping jaws; means for moving said jaws toward and from each other and including a reciprocating member; a rotatable shaft; means connecting said reciprocating member with said shaft; main driving means; a clutch normally operative to engage said main driving means; means rotatable by said shaft; lever mechanism adapted to be actuated by said latter means during each rotation of said shaft to turn said clutch out of engagement with said main driving means whereby said shaft will be stopped after each revolution; a latch carried by said lever mechanism; means for automatically moving said latch into the path of said latter actuating means; means for locking said latch in said latter position; and means for releasing said locking means; said lever mechanism including two independently pivoted levers, one of which carries said latch, the other being connected to said clutch; said levers having contacting portions; the distance between the fulcrums of said levers to the contacting portions of said levers being different whereby a mechanical advantage is obtained; substantially as described.

In testimony whereof I have signed my name to this specification in the presence of two subscribing witnesses.

LAWRENCE F. BOYE.

Witnesses:
MARY A. INGLAR,
CHAS. E. POTTS.

Copies of this patent may be obtained for five cents each, by addressing the "Commissioner of Patents, Washington, D. C."